United States Patent
Ma et al.

(10) Patent No.: US 8,976,327 B2
(45) Date of Patent: Mar. 10, 2015

(54) OPTICAL SHUTTER APPLICABLE IN STEREOSCOPIC VIEWING GLASSES

(75) Inventors: Jiaying Ma, Cottage Grove, MN (US); Hassan Sahouani, Hastings, MN (US); Feng Bai, Woodbury, MN (US); Vadim N. Savvateev, St. Paul, MN (US); Jesus R. Ramos, Tucson, AZ (US); Hugo B. Montano, Tucson, AZ (US)

(73) Assignee: 3M Innovative Properties Company, St. Paul, MN (US)

( * ) Notice: Subject to any disclaimer, the term of this patent is extended or adjusted under 35 U.S.C. 154(b) by 165 days.

(21) Appl. No.: 13/640,514

(22) PCT Filed: May 3, 2011

(86) PCT No.: PCT/US2011/034889
§ 371 (c)(1),
(2), (4) Date: Oct. 11, 2012

(87) PCT Pub. No.: WO2011/140012
PCT Pub. Date: Nov. 10, 2011

(65) Prior Publication Data
US 2013/0038803 A1  Feb. 14, 2013

Related U.S. Application Data

(60) Provisional application No. 61/331,624, filed on May 5, 2010.

(51) Int. Cl.
*G02F 1/1337* (2006.01)
*G02B 5/00* (2006.01)
(Continued)

(52) U.S. Cl.
CPC ........ *G02F 1/133711* (2013.01); *G02F 1/1337* (2013.01); *G02B 5/005* (2013.01);
(Continued)

(58) Field of Classification Search
CPC .................. G02F 1/1337; G02F 1/133711
USPC ...................................................... 349/123
See application file for complete search history.

(56) References Cited

U.S. PATENT DOCUMENTS

| 5,948,487 A | 9/1999 | Sahouani et al. |
| 6,245,399 B1 | 6/2001 | Sahouani et al. |

(Continued)

FOREIGN PATENT DOCUMENTS

| WO | WO 03/065107 | 8/2003 |
| WO | WO 2010/096310 | 8/2010 |

OTHER PUBLICATIONS

PCT International Search Report for PCT/US2011/034889 dated Aug. 12, 2011, 5 pages.

(Continued)

*Primary Examiner* — Phu Vu
(74) *Attorney, Agent, or Firm* — Robert S. Moshrefzadeh (57) ABSTRACT

Optical shutter (50), e.g. fort-stereoscopic shutter glasses, is disclosed. The optical shutter includes a light source, e.g. LCD, CRT or plasma display, that emits polarized light (12) that has a first polarization state, a first polymeric substrate (100) that receives the polarized light and transmits the polarized light without substantially changing the first polarization state of the polarized light, a second polymeric substrate (107) that faces the first polymeric substrate, and an optical stack (60) that is disposed between the first and second polymeric substrates. The optical stack includes first and second electrically conductive layers (101, 102), first and second oriented chromonics alignment layer (103, 106), and an oriented liquid crystal layer (105).

39 Claims, 3 Drawing Sheets (51) Int. Cl.
  *G02B 27/22* (2006.01)
  *G02F 1/1335* (2006.01)
  *H04N 13/04* (2006.01)
  *G02F 1/1333* (2006.01)

(52) U.S. Cl.
  CPC ...... *G02B27/2264* (2013.01); *G02F 1/133305* (2013.01); *G02F 1/133528* (2013.01); *G02F 2001/13356* (2013.01); *G02F 2001/133726* (2013.01); *G02F 2201/501* (2013.01); *H04N 13/0438* (2013.01); *H04N 13/0497* (2013.01); *H04N 2213/008* (2013.01)
  USPC ........................................................ 349/123

(56) References Cited

U.S. PATENT DOCUMENTS

| | | | |
|---|---|---|---|
| 6,395,354 B1 | 5/2002 | Sahouani et al. |
| 6,456,432 B1 | 9/2002 | Lazzaro et al. |
| 6,488,866 B1 | 12/2002 | Sahouani et al. |
| 6,524,665 B2 | 2/2003 | Sahouani et al. |
| 6,645,578 B2 | 11/2003 | Sahouani et al. |
| 6,699,533 B2 | 3/2004 | Sahouani et al. |
| 6,727,867 B2 | 4/2004 | Divelbiss et al. |
| 2006/0285026 A1 | 12/2006 | Robinson |

OTHER PUBLICATIONS

Sergan et al., Polarizing-alignment layers for twisted nematic cells, Liquid Crystals, 2000. vol. 27, No. 5. pp. 567-572.

Suk-Wah Tam-Chang and Liming Huang, "Chromonic liquid crystals: properties and applications as functional materials", Chemical Communications, 2008, pp. 1957-1967.

Matsunaga et al., "Photofabrication of Micro-Patterned Polarizing Elements for Stereoscopic Displays", Advanced Materials, vol. 14, No. 20, 2002, pp. 1477-1480.

John Lydon, "Chromonic review", Journal of Materials Chemistry, 2010, vol. 20, 2010, pp. 10071-10099.

Gregory P. Crawford, "Flexible Flat Panel Display Technology", Flexible Flat Panel Dispalys, 2005, pp. 1-9, 33, and 55-77.

Attwood, T.K. and Lydon, T.E., "Lyotropic Mesophase Formation by Anti-Asthmatic Drugs", Molecular Crystals Liquid Crystals, 1984, vol. 108, pp. 349-357.

OPTICAL SHUTTER APPLICABLE IN STEREOSCOPIC VIEWING GLASSES

CROSS REFERENCE TO RELATED APPLICATIONS

This application is a national stage filing under 35 U.S.C. 371 of PCT/US2011/034889, filed May 3, 2011, which claims priority to U.S. Provisional Application No. 61/331,624, filed May 5, 2010, the disclosure of which is incorporated by reference in its/their entirety herein.

FIELD OF THE INVENTION

This invention generally relates to optical shutters. In particular, the invention relates to light-weight flexible optical shutters that incorporate a flexible liquid crystal optical shutter.

BACKGROUND

Typical liquid crystal shutters include a first polarizer, a liquid crystal cell and a second polarizer having its polarization axis substantially perpendicular to the first polarizer. In its off-state, typically known as the non-energized state, the shutter transmits light. Here, the shutter's first polarizer absorbs light that is polarized parallel to its absorption axis and transmits light that is polarized perpendicular to this axis. The transmitted polarized light is then twisted 90 degrees by the liquid crystal cell in such a manner that its polarization direction becomes parallel to the transmission axis of the second polarizer allowing the light to pass through to the viewer. In the energized or on-state, the shutter absorbs light. Here, a voltage is applied to the liquid crystal cell and no twist is applied to the polarized light that is transmitted by the first polarizer, resulting in the transmitted light being absorbed by the second polarizer. Shutters of this type find applications in many fields such as liquid crystal displays, camera shutters and stereoscopic viewing devices such as stereoscopic viewing glasses.

Typical stereoscopic viewing glasses include two separate glass-based liquid crystal shutters that open and close in an alternating pattern synchronized to the image source. The shutters are typically made by laminating polarizers to the outside of the liquid crystal shutters resulting in the stereoscopic glasses having substantial weight.

SUMMARY OF THE INVENTION

The present invention generally relates to optical shutters. In one embodiment, an optical shutter includes a light source that emits polarized light that has a first polarization state, a first polymeric substrate that receives the polarized light and transmits the polarized light without substantially changing the first polarization state of the polarized light, a second polymeric substrate that faces the first polymeric substrate, and an optical stack that is disposed between the first and second polymeric substrates. The optical stack includes first and second electrically conductive layers, first and second oriented chromonics alignment layer, and an oriented liquid crystal layer. In some cases, the light source includes a lamp that emits non-polarized light and means for polarizing the emitted non-polarized light, where the polarizing means can, for example, include a reflective or absorbing polarizer. In some cases, the first polarization state is a linear polarization state. In some cases, the first polarization state is a circular polarization state. In some cases, the first polymeric substrate is substantially optically isotropic. In some cases, the first polymeric substrate is substantially optically uniaxial.

In some cases, the optical shutter includes a first barrier layer. In some cases, the first barrier layer prevents diffusion of at least one of moisture and gas. In some cases, the first barrier layer includes several sub-layers. In some cases, at least one of the sub-layers includes a polymeric material or an inorganic material. In some cases, the inorganic material includes silica. In some cases, the optical shutter includes a second barrier layer.

In some cases, at least one of the first and second electrically conductive layers includes indium tin oxide. In some cases, at least one of the first and second electrically conductive layers comprises an organic material. In some cases, at least one of the first and second electrically conductive layers includes a blend of organic and inorganic materials. In some cases, at least one of the first and second electrically conductive layers is substantially, such as at least 50%, or at least 70%, optically transmissive. In some cases, the sheet resistance of at least one of the first and second electrically conductive layers is in a range from about 60 ohms/square to about 800 ohms/square, or from about 100 ohms/square to about 300 ohms/square. In some cases, at least one of the first and second oriented chromonics alignment layers includes a dichroic dye. In some cases, the dichroic dye is oriented along the first polarization state. In some cases, the optical shutter also includes one or more retarder layers. In some cases, the retarder layers are outside the optical stack. In some cases, the oriented liquid crystal layer is in a twisted nematic (TN) mode. In some cases, the oriented liquid crystal layer is in an optically compensated bend (OCB) mode. In some cases, the optical shutter also includes one or two polarizers, such as one or two linear polarizers. In some cases, the optical stack includes an adhesion promoting layer that is immediately adjacent the first or second electrically conductive layer. The adhesion promoting layer promotes that adhesion between the electrically conductive layer and a neighboring layer. In some cases, the adhesion promoting layer includes $SiO_x$.

In some cases, a stereoscopic viewing device for viewing 3D images includes first and second optical shutters, where each optical shutter has an on-state and an off-state; means for controlling the on- and off-states of each of the first and second optical shutters; and means for synchronizing the on- and off-states of each of the first and second optical shutters with a signal that is emitted by the polarized light source. In some cases, the signal emitted by the polarized light source includes an IR signal. In some cases, the signal emitted by the polarized light source includes an RF signal. In some cases, the signal emitted by the polarized light source includes a microwave signal. In some cases, the first and second optical shutters are mounted on a frame.

BRIEF DESCRIPTION OF THE DRAWINGS

The invention may be more completely understood and appreciated in consideration of the following detailed description of various embodiments of the invention in connection with the accompanying drawings, in which.

In the specification, a same reference numeral used in multiple figures refers to the same or similar elements having the same or similar properties and functionalities.

DETAILED DESCRIPTION

The present invention generally relates to optical shutters. The invention particularly relates to polymer based optical shutters that are capable of being used for viewing three dimensional images. The disclosed optical shutters are light weight, flexible, conformable, and have reduced manufacturing cost.

Figure 1:
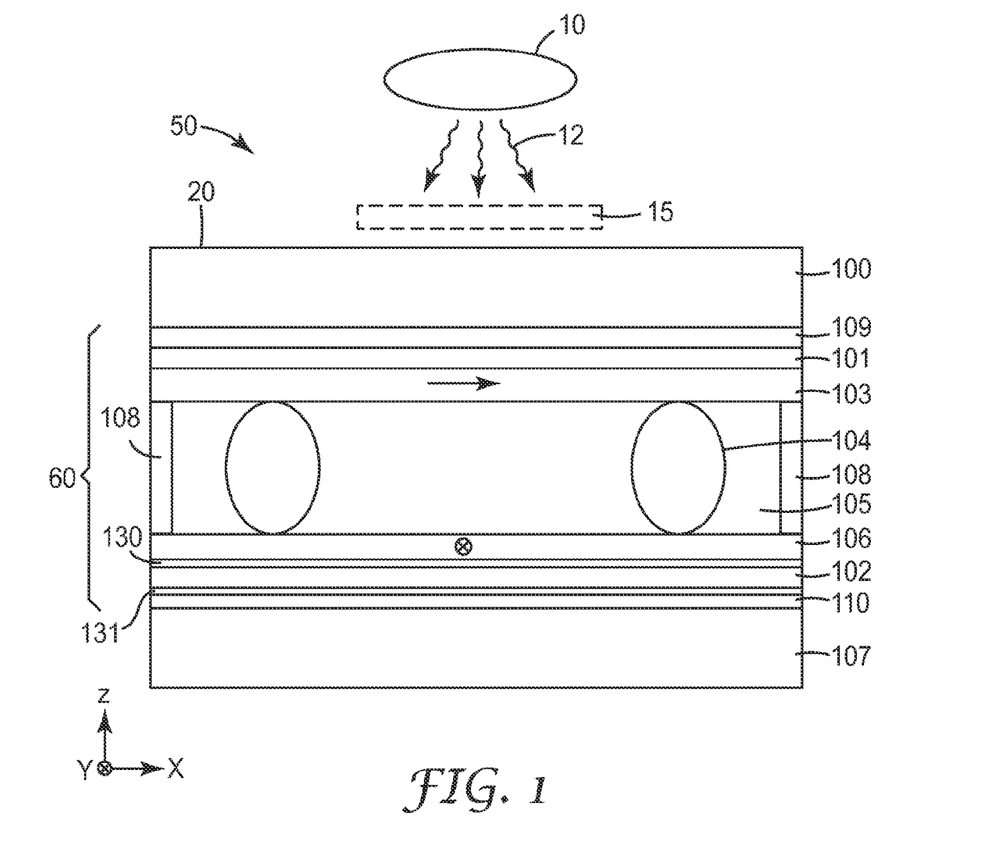
FIG. 1 is a schematic cross-section of an optical shutter.

FIG. 1 is a schematic cross-section of an optical shutter 50 that includes a light source 10 emitting a polarized light 12 having a first polarization state and an optical stack 60 disposed between a first polymeric substrate 100 and a second polymeric substrate 107. In general, light source 10 can be any light source that may be desirable in an application. For example, in some cases, light source 10 can be an image forming and emitting light source such as a cathode ray tube (CRT), a liquid crystal display (LCD) or a plasma display. In some cases, light source 10 may be a non-image-forming light source.

In general, the polarization state of emitted polarized light 12 can be any polarization state that may be desirable in an application. For example, in some cases, the polarization state of emitted polarized light 10 can be a linear polarization state, a circular polarization state, or an elliptical polarization state.

In some cases, emitted light 12 may be non-polarized or partially polarized light. In such cases, optical shutter 50 can include means 15 for polarizing emitted non-polarized light 12. For example, means 15 can include polarizers, such as reflective or absorbing polarizers, or combinations of polarizers and other optical elements such as retarders.

First polymeric substrate 100 receives emitted polarized light 12 and transmits the polarized light without substantially changing the first polarization state of the polarized light. For example, in such cases, at least 70%, or at least 75%, or at least 80%, or at least 85%, or at least 90%, or at least 95%, of the light transmitted by first polymeric substrate 100 is polarized having the first polarization state.

In some cases, first polymeric substrate 100 transmits polarized light 12 without substantially changing the first polarization state of the polarized light by being substantially optically isotropic. In such cases, first polymeric substrate 100 can be characterized by three equal or nearly equal refractive indices along three mutually orthogonal directions. For example, in such cases, the difference between the refractive indices is less than 5%, or less than 4%, or less than 3%, or less than 2%, or less than 1%, or less than 0.5%.

In some cases, first polymeric substrate 100 transmits polarized light 12 without substantially changing the first polarization state of the polarized light by being substantially optically uniaxial. In some cases, a uniaxial first polymeric substrate 100 can be formed while subject to an extensional force primarily in one direction. For example, in some cases, a uniaxial first polymeric substrate 100 can be an extruded polymeric film that is stretched primarily in one direction during or after extrusion. A uniaxial first polymeric substrate 100 has three indices of refraction along three mutually orthogonal directions with two of the refractive indices being equal or nearly equal to one another and different from the third refractive index. For example, in such cases, the difference between the two nearly equal refractive indices is less than 5%, or less than 4%, or less than 3%, or less than 2%, or less than 1%, or less than 0.5%. A uniaxial first polymeric substrate does not alter, or alters very little, the polarization state of a polarized emitted light 12 that has a linear polarization state substantially parallel to one of the directions of the refractive indices.

In some cases, first polymeric substrate 100 is weakly birefringent. For example, in such cases, first polymeric substrate 100 has a retardation that is less than 10 nanometers, or less than 8 nanometers, or less than 6 nanometers, or less than 5 nanometers.

In general, first polymeric substrate 100 can include any material that is capable of transmitting polarized light without substantially affecting the polarization state of the polarized light. Exemplary materials include polycarbonate (PC), polymethylmethacrylate (PMMA), and triacetate cellulose (TAC).

The second polymeric substrate 107 faces the first polymeric substrate 100. In general, second polymeric substrate can be any substrate that may be desirable in an application. For example, in some cases, second polymeric substrate 107 can be similar to first polymeric substrate 100 and have the capability of transmitting polarized light without substantially changing the polarization state of the polarized light. For example, in such cases, second polymeric substrate 107 can be an optically isotropic or uniaxial substrate. In some cases, second polymeric substrate 107 can be a birefringent substrate. In general, second polymeric substrate 107 can include any material that may be desirable in an application. Exemplary materials include polyethylene terephthalates, polycarbonates, polyarylates, polysulfones, polyacrylates, polymethacrylates and the like.

Optical stack 60 includes a first barrier layer 109, a first electrically conductive layer 101 disposed on the first barrier layer, a first oriented chromonics alignment layer 103 disposed on the first electrically conductive layer, an oriented liquid crystal layer 105 disposed on the first oriented chromonics alignment layer, a second oriented chromonics alignment layer 106 disposed on the oriented liquid crystal layer, a second electrically conductive layer 102 disposed on the second oriented chromonics alignment layer, and a second barrier layer 110 disposed on second electrically conductive layer 102 and second polymeric substrate 107.

In some cases, first and second barrier layers 109 and 110 are designed primarily to prevent or block diffusion of at least one of humidity and gas into the layers that are disposed between the two barrier layers. In some cases, such as in the exemplary optical stack 60 illustrated in FIG. 1, first barrier layer 109 is immediately adjacent to first polymeric substrate 100 and second barrier layer 110 is immediately adjacent to second polymeric substrate 107, where by two immediately adjacent layers it is meant that there are no intervening layers. In some cases, there may be one or more intervening layers disposed between a barrier layer and an associated substrate. For example, in some cases, there may be one or more layers, not expressly shown in FIG. 1, disposed between first barrier layer 109 and first polymeric substrate 100 and/or between second barrier layer 110 and second polymeric substrate 107.

In some cases, a disclosed barrier layer, such as first barrier layer 109 or second barrier layer 110, can include several, such as two or more, sub-layers. In some cases, a sub-layer can include an organic material, a polymeric material, or an inorganic material. For example, in some cases, a barrier layer can include alternating sub-layers of organic and inorganic materials. Examples of organic materials include acrylates, methacrylates and the like. Examples of inorganic materials include silica and other transparent inorganics. In some cases, a sub-layer of a barrier layer can include a mixture of organic and inorganic materials within the same sub-layer.

In the exemplary optical shutter 50, barrier layers 109 and 110 are disposed between polymeric substrates 100 and 107. In some cases, a barrier layer may be disposed on an exterior major surface of a substrate. For example, in some cases, barrier layer 109 may be disposed on an exterior major surface 20 of first polymeric substrate 100.

In general, first and second electrically conductive layers 101 and 102 can include any electrically conductive material that may be desirable in an application. In some cases, at least one of, such as both, electrically conductive layers 101 and 102 can include an electrically conductive organic material, such as an electrically conductive polymer, such as polypyrrole, polyaniline, polyacetylene, and polythiophene. In some cases, at least one of, such as both, electrically conductive layers 101 and 102 can include an electrically conductive inorganic material, such as a conductive oxide, such as indium tin oxide (ITO), fluorine doped tin oxide, tin antimony oxide (TAO), and the like. In some cases, at least one of, such as both, electrically conductive layers 101 and 102 can include a blend of organic and inorganic electrically conductive materials.

In general, electrically conductive layers 101 and 102 can have any optical transmission that may be desirable in an application. In some cases, at least one of first and second electrically conductive layers 101 and 102 is substantially optically transmissive. For example, in such cases, the average optical transmission of at least one of first and second electrically conductive layers 101 and 102 in the visible range of the electromagnetic spectrum is at least 50%, or at least 60%, or at least 70%, or at least 80%, or at least 90%.

The electrical conductivity of first and second electrically conductive layers 101 and 102 is sufficiently high so that optical shutter can switch between the on and off states with reasonable speed. For example, in some cases, the sheet resistance of at least one of the first and second electrically conductive layers is in a range from about 20 ohms/square to about 1000 ohms/squares, or from about 40 ohms/square to about 800 ohms/squares, or from about 60 ohms/square to about 800 ohms/squares, or from about 80 ohms/square to about 600 ohms/squares, or from about 80 ohms/square to about 500 ohms/squares, or from about 80 ohms/square to about 400 ohms/squares, or from about 100 ohms/square to about 400 ohms/squares, or from about 100 ohms/square to about 300 ohms/squares.

In some cases, optical stack 60 can include an adhesion promoting layer to improve the adhesion of electrically conductive layers 101 and 102 to their neighboring layers. For example, in some cases, optical stack 60 can include an adhesion promoting layer that is immediately adjacent first electrically conductive layer 101 or second electrically conductive layer 102 for promoting adhesion between the electrically conductive layer and a neighboring layer. For example, in some cases, optical stack 60 can include a first adhesion promoting layer 130 disposed between second electrically conductive layer 102 and second oriented chromonics alignment layer 106 and/or a second adhesion promoting layer 131 disposed between second electrically conductive layer 102 and second barrier layer 110. In general, adhesion promoting layers 130 and 131 can include any material that is capable of improving adhesion between second electrically conductive layer 102 and its neighboring layers. In some cases, adhesion promoting layers 130 and 131 can be or include $SiO_x$, where in some cases, the thickness of the $SiO_x$ layer can be less than about 20 nanometers, or less than about 15 nanometers, or less than about 10 nanometers.

First and second oriented chromonics alignment layers 103 and 106 include chromonics molecules. As used herein, the term "chromonic" refers to a non-polymeric molecule that includes a hydrophobic core portion having multiple aromatic and/or heteroaromatic rings, with multiple hydrophilic substituents arranged around the periphery of the hydrophobic core portion and connected thereto by covalent bonds. When in a solvent, such as an aqueous solution, the chromonic molecules aggregate into columns rather than into micelles and do not exhibit a critical micelle concentration or a Krafft temperature.

Chromonic materials have been described, for example, in Attwood, T. K., and Lydon, T. E.; *Molec. Crystals. Liq. Crystals,* 108, 349 (1984). Chromonic molecules are further described in, for example, U.S. Pat. No. 5,948,487, and International Patent Application No. PCT/US 2010/023732, filed Feb. 10, 2010, titled "Optical Control Devices and Methods of Making", claiming priority from Provisional U.S. patent application Ser. No. 61/152,999, filed Feb. 17, 2009, the disclosures of which are incorporated herein by reference in their entireties.

Chromonics molecules are relatively large and flat molecules capable of forming ordered structures when dissolved in a solvent such as water. Exemplary chromonic compounds include 4-Dimethylamino-1-[4,6-di(4-carboxyphenylamino)-1,3,5-triazin-2-yl]pyridinium hydrogen sulfate and [4,6-di(4-carboxyphenylamino)-1,3,5-triazin-2-yl]pyridinium hydrogen sulfate described in, for example, U.S. Pat. No. 5,948,487.

When a solution of the chromonics molecules is suitably coated, such as shear coated, onto a substrate and dried, a thin film of highly ordered chromonic material can be formed that can function as an alignment layer for a liquid crystal material, such as a thermotropic liquid crystal material, that is brought into contact with the layer of the dried chromonic material. In some cases, chromonic materials disclosed herein can have a molecular weight of at most about 2400, or at most about 1600, or at most about 800.

In general, chromonic materials disclosed herein are substantially optically clear and transmissive. For example, in some cases, the average optical transmission of a dried film of a chromonic material is greater than about 60%, or greater than about 70%, or greater than about 80%, or greater than about 90%, or greater than about 95%.

In some cases, one or more substances can be added to a chromonic material to provide additional functionality to the coated and dried chromonic layer. For example, in some cases, one or more dyes can be added to a chromonic material. For example, in some cases, a chromonic material can include one or more dichroic or pleochroic dyes, where, as used herein, the term pleochroic means that the light absorption of the dye molecule varies as a function of the orientation of the molecule with respect to the polarization of incident light. An oriented dried chromonic material that includes a pleochroic dye can function as a polarizer in addition to, for example, its function as an alignment layer for a liquid crystal material. Exemplary suitable pleochroic dyes include parallel-colorless dyes and perpendicular-colorless dyes.

In some cases, a chromonic material can include at least one non-orienting, such as non-pleochroic, dye. In such cases, the non-orienting dye can provide, for example, color filtration capability or infrared filtration capability. In some cases, one or more non-orienting dyes can be combined with one or more pleochroic dyes to form a color polarizer.

In general, a layer of a chromonic material can be formed on a surface of a substrate by, for example, applying, such as coating, onto the substrate surface a coating composition that includes the chromonic material. In some cases, the coating composition can be prepared by dissolving the chromonic material into an aqueous solution. In some cases, the aqueous solution can include one or more pH-adjusting compounds to, for example, improve the solubility of the chromonic material. Exemplary suitable pH-adjusting compounds include any known base, such as ammonium hydroxide, sodium hydroxide, or various amines, such as ethylene diamine. In some cases, the chromonic material can be dissolved in the aqueous solution at a temperature less than about 40° C., where the aqueous solution is adjusted to a pH of around 7-10 by the addition of one or more bases.

In some cases, the coating composition can include one or more surfactants to promote wetting of the coating composition onto the surface of the substrate. Exemplary suitable surfactants include ionic surfactants, non-ionic surfactants, or combinations thereof. In some cases, the viscosity of the coating composition can be modified by adding one or more water-soluble polymeric additives, such as polyethylene glycol or low molecular weight hydrolyzed starches, to the coating composition. In some cases, one or more additives or surfactants may be present in the coating composition at an amount corresponding to at least 0.01, or at least 0.05, or at least 0.1, weight percent (relative to the dried coating weight of the chromonic material). In some cases, one or more additives or surfactants may be present in the coating composition at an amount corresponding to at most 1.0, or at most 0.5, or at most 0.3, weight percent (relative to the dried coating weight of the chromonic material).

In some embodiments, one or more organic solvents can be added to the coating composition. For example, in such cases, the organic solvents can be added to the coating composition to achieve an organic solvent concentration of at least 0.1, or at least 0.5, or at least 1, or at least 3, or at least 5, weight percent of the coating composition. In some cases, the organic solvents may be added to the coating composition to achieve an organic solvent concentration up to 10, or up to 9, or up to 8, or up to 7, weight percent of the coating composition.

In some cases, the coating composition can include one or more pleochroic dyes and/or non-orienting dyes to provide wavelength filtering and/or polarizing capabilities to the dried and oriented chromonic material layer.

In general, the coating composition can be applied to a surface of a substrate by any suitable method that can result in an ordered arrangement of the chromonic material at a desired dry thickness. Exemplary suitable coating methods include extrusion methods, such as extrusion methods that employ high precision extrusion dies, and coating methods that utilize a coating knife or a coating rod, such as a wire-wound coating rod. In some cases, the chromonic material can be ordered as coated onto the substrate by applying orientation mechanisms, such as shear orientation mechanisms or magnetic orientation mechanisms, to the coating composition during and/or after the application of the coating composition to the substrate. For example, applying a shear force during the coating of the coating composition can promote orientation of the molecules of chromonic material such that, upon drying, an oriented structure is obtained.

In general, the coating composition can be applied to a substrate at any useful and desirable wet coating thickness. In some cases, the coating composition can be applied to the substrate at a uniform wet coating thickness of at least 1, or at least 3, or at least 5, or at least 10, microns. In some cases, the coating composition can be applied to the substrate at a uniform wet coating thickness of up to 25, or up to 20, or up to 15, or up to 12, microns.

Drying of the coated layer can be achieved using any suitable drying method that can allow the chromonic material to form and/or maintain an oriented structure. Exemplary suitable drying methods include drying methods that do not damage the coating or significantly disrupt any orientation that is imparted to the oriented chromonic material during coating or deposition. In some cases, the coated chromonic material is dried so as to contain at most 1, or at most 0.5, or at most 0.1, weight percent water. In some cases, the thickness of the dried and oriented chromonic material layer can be at least 0.5, or at least 1, or at least 2, microns. In some cases, the thickness of the dried and oriented chromonic material layer can be at most about 15, or at most about 10, or at most about 5 microns.

Referring back to FIG. 1, each of first and second oriented chromonics alignment layers 103 and 106, includes one or more chromonic materials and any other material, such as an orienting or non-orienting dye, that may be desirable in an application.

Optical stack 60 also includes a plurality of spacers 104 for maintaining a separation, space, or gap between first and second oriented chromonics alignment layers 103 and 106, where the gap is filled with oriented liquid crystal layer 105. In general, spacers 104 can be any spacer that is capable of maintaining a gap, such as a uniform gap, between layers 103 and 106. Exemplary spacers include polymer or glass beads.

In general, spacers 104 can have any size that may be desirable in an application. In some cases, the average size of spacers 104 is about 1, or about 2, or about 3, or about 4, or about 5, microns.

Optical stack 60 also includes a sealant 108 for confining liquid crystal layer 105 to the region between oriented chromonics alignment layers 103 and 106. In general, sealant 108 can include any material that is capable of sealing the liquid crystal layer. Exemplary suitable sealing materials include adhesives, such as epoxy adhesives.

In some cases, the molecular orientation of first oriented chromonics alignment layer 103 is substantially perpendicular to the molecular orientation of second oriented chromonics alignment layer 106. For example, in some cases, first oriented chromonics alignment layer 103 can be oriented substantially along the x-axis and second oriented chromonics alignment layer 106 can be oriented substantially along the y-axis. In such cases, liquid crystal layer 105 is in a twisted nematic (TN) mode, meaning that a portion of the liquid crystal layer that is adjacent to and directly in contact with first oriented chromonics alignment layer 103 is substantially oriented parallel to the molecular orientation of this layer (for example, the x-direction) and a portion of the liquid crystal layer that is adjacent to and directly in contact with second oriented chromonics alignment layer 106 is substantially oriented parallel to the molecular orientation of this layer (for example, the y-direction). The substantially mutually orthogonal orientations of oriented chromonics alignment layers 103 and 106 impose a twist on liquid crystal layer 105 along the z-direction which is along the gap direction.

In some cases, the first polarization state of emitted polarized light 12 is parallel to the orientation of first oriented chromanics alignment layer 103. For example, in some cases, the first polarization state and first oriented chromanics alignment layer 103 are oriented along the x-direction and second oriented chromanics alignment layer 106 is oriented along the y-direction.

In some cases, at least one of first and second oriented chromonics alignment layers 103 and 106 includes a dichroic or pleochroic dye. For example, in some cases, second oriented chromanics alignment layer 106 includes one or more dichroic or pleochroic dyes. In some cases, the dichroic or pleochroic dye is oriented along the direction of the first polarization state of emitted polarized light 12. For example, in some cases, the first polarization state of emitted polarized light 12 is oriented along the x-direction, first oriented chromanics alignment layer 103 is oriented along the x-direction, second oriented chromanics alignment layer 106 is oriented along the y-direction, and alignment layer 106 includes a dichroic or pleochroic dye that is oriented along the y-direction. In such cases, second oriented chromanics alignment layer 106 functions both as an alignment layer and as a polarizer having a polarizing axis along the y-direction. In the off-state, that is when no signal, such as no voltage, is applied across liquid crystal layer 105, optical shutter 50 transmits a substantial portion, such as at least 60%, or at least 70%, or at least 80%, or at least 90%, of light 12. In the on-state, that is when a sufficient signal, such a sufficient voltage, is applied across liquid crystal layer 105, optical shutter 50 blocks or absorbs a substantial portion of light 12. In such cases, optical shutter 50 transmits less than about 20%, or less than about 15%, or less than about 10%, or less than about 5%, or less than about 4%, or less than about 3%, or less than about 2%, or less than about 1%, or less than about 0.5%, or less than about 0.1%, of light 12.

In some cases, optical shutter 50 may include one or more additional optical elements or components not expressly illustrated in FIG. 1. Exemplary additional optical elements or components include, polarizer layers or retarder layers, or a combination of polarizer and retarder layers. For example, in some cases, optical shutter 50 can include one or more retarder layers where, in some cases, the retarder layers are included in optical stack 60, and in some cases, at least one retarder layer is disposed outside of optical stack 60. For example, in some cases, a retarder layer may be disposed on exterior major surface 20 of first polymeric substrate 100.

Figure 2:
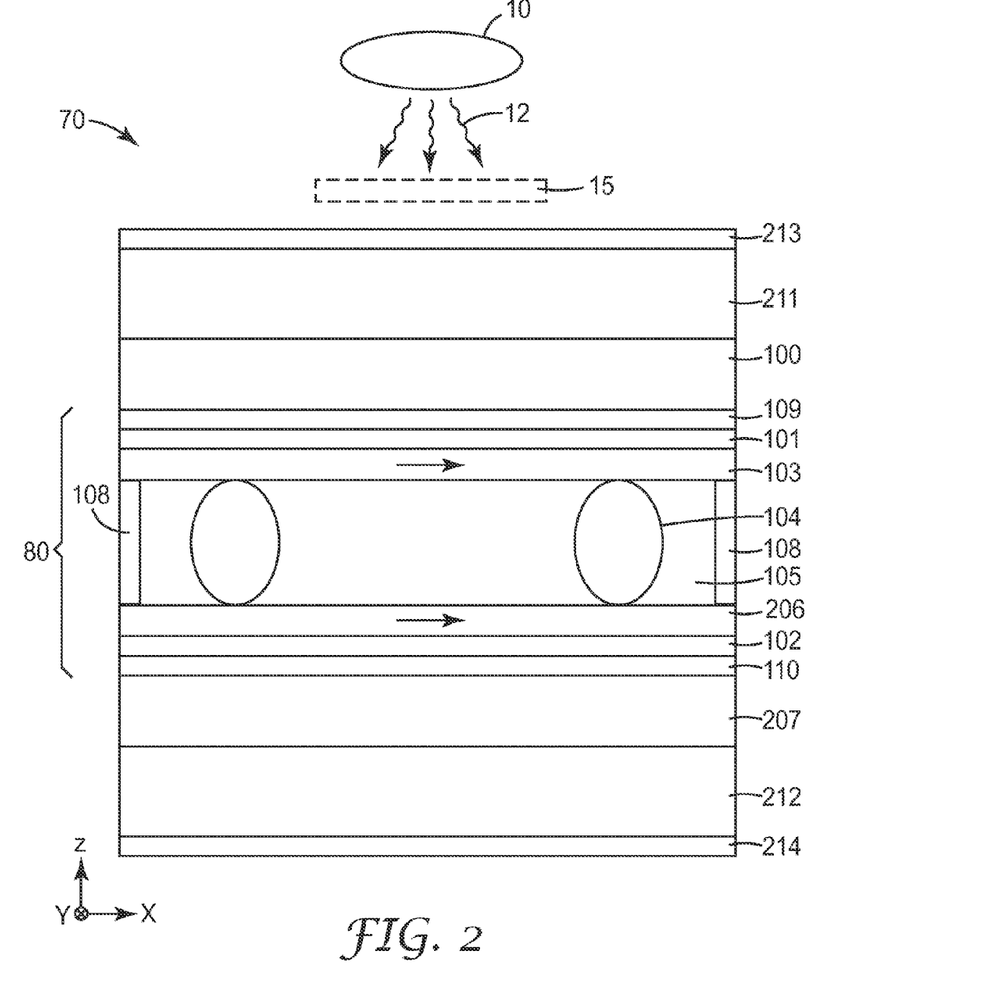
FIG. 2 is a schematic cross-section of another optical shutter.

FIG. 2 is a schematic cross-section of an optical shutter 70 that includes light source 10 emitting polarized light 12 having a first polarization state and an optical stack 80 disposed between first polymeric substrate 100 and second polymeric substrate 107. Optical stack 80 includes a second oriented chromanics alignment layer 206 that is oriented substantially along the same direction as the direction of the orientation of first oriented chromanics alignment layer 103. For example, in some cases, first and second oriented chromanics alignment layers 103 and 206 are oriented along the x-direction.

Optical shutter 70 includes a first retarder layer 211 disposed on first polymeric substrate 100, a first polarizer layer 213 disposed on the first retarder layer, a second retarder layer 212 disposed on a second polymeric substrate 207, and a second polarizer layer 214 disposed on the second retarder layer.

Second polymeric substrate 207 is capable of receiving a polarized incident light and transmitting the polarized light without substantially changing the polarization state of the incident polarized light. For example, at least 70%, or at least 75%, or at least 80%, or at least 85%, or at least 90%, or at least 95%, of the transmitted light has the same polarization state as the incident polarized light. In some cases, second polymeric substrate 207 is substantially optically isotropic. In such cases, the difference between the refractive indices of second polymeric substrate 207 is less than 5%, or less than 4%, or less than 3%, or less than 2%, or less than 1%, or less than 0.5%. In some cases, second polymeric substrate 207 is substantially optically uniaxial. In some cases, second polymeric substrate 207 is weakly birefringent. For example, in such cases, second polymeric substrate 207 has a retardation that is less than 10 nanometers, or less than 8 nanometers, or less than 6 nanometers, or less than 5 nanometers.

First and second oriented chromanics alignment layers 103 and 206 are oriented substantially along the same direction, such as the x-direction. As a result, portions of liquid crystal layer 105 that are adjacent to and directly in contact with each of first and second oriented chromanics alignment layers 103 and 206, are oriented substantially along the molecular orientations of the two alignment layers (for example, the x-direction). The substantially parallel orientations of oriented chromonics alignment layers 103 and 206 direct liquid crystal layer 105 to be in an optically compensated bend (OCB) mode.

Each of first and second polarizer layers 213 and 214 substantially transmits one polarization state and substantially blocks, such as reflects or absorbs, an orthogonal polarization state. In some cases, at least one of first and second polarizer layers 213 and 214 includes an oriented chromonics layer that includes an oriented dichroic or pleochroic dye.

Figure 3:
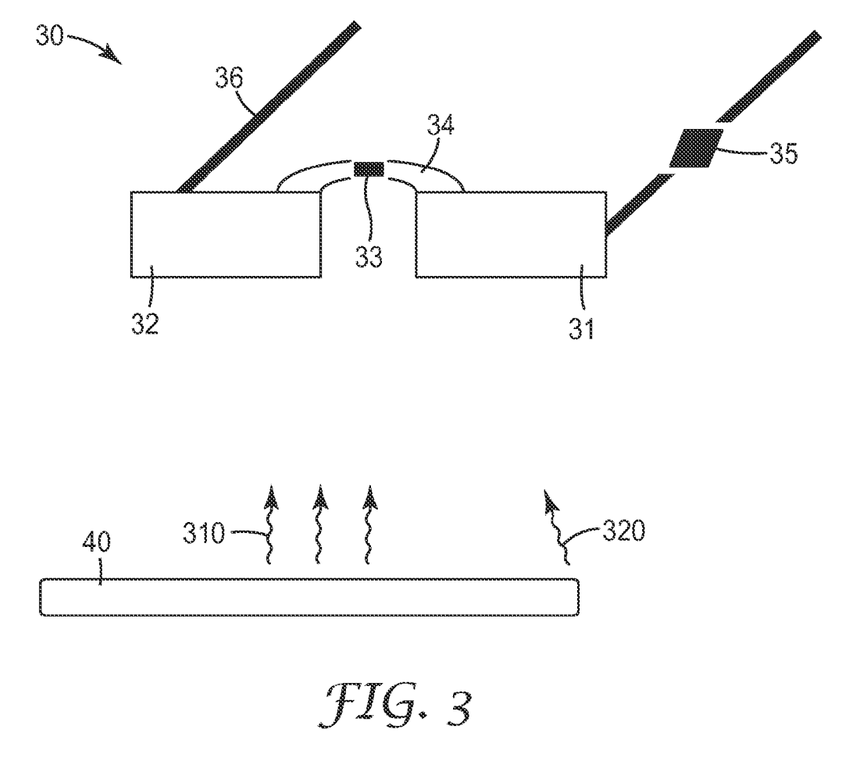
FIG. 3 is a schematic three-dimensional view of a stereoscopic viewing device.

FIG. 3 is a schematic three-dimensional view of a stereoscopic viewing device 30 for viewing a polarized image or information 310 emitted by a polarized image forming and emitting light source 40 that can be similar to light source 10. Stereoscopic viewing device 30 includes a first optical shutter 31 and a second optical shutter 32. Each of optical shutters 31 and 32 can be an optical shutter disclosed herein, such as optical shutter 50 or optical shutter 70. In general, optical shutters 31 and 32 are substantially in the same mode, such as the TN mode or the OCN mode.

First and second optical shutters are mounted on a support 34 and frames 36. In some cases, stereoscopic viewing device 30 can be 3D glasses for observing an image with parallax from individual right and left eye viewpoints. In such cases, support 34 can be a nose piece of the 3D glasses and frames 36 can form the temple and earpiece of the 3D glasses.

Each of first and second optical shutters 31 and 32 has an on-state and an off-state. Stereoscopic viewing device 30 also includes means 35, such as a drive 35, for powering and controlling the on- and off-states of each of first and second optical shutters 31 and 32, and synchronizing means 33 for synchronizing the on- and off-states of each of first and second optical shutters 31 and 32 with a signal 320 that is emitted by polarized light source 40. The on- and off-states alternate between the two optical shutters at a suitable frequency that, in some cases, matches the frequency at which images 310 are emitted from light source 40.

In general, signal 320 can be any type signal that can facilitate synchronization of optical shutters 31 and 32. For example, in some cases, signal 320 can be or include an IR signal, an RF signal, or a microwave signal.

Some of the advantages of the disclosed optical stacks and optical shutters are further illustrated by the following examples. The particular materials, amounts and dimensions recited in this example, as well as other conditions and details, should not be construed to unduly limit the present invention.

EXAMPLE

A first chromonics coated PET layer was prepared. A 6 nm thick first $SiO_x$ layer was sputter coated onto a 250 micron thick polyethylene terephthalate (PET) substrate (available as MELINEX ST730 from DuPont, Wilmington, Del.) using a 99.99% Silicon sputter target (available from Academy Group, Albuquerque, N.M.). Next, a 19 nm thick Indium Tin Oxide (ITO) layer was sputter coated on top of the first $SiO_x$ layer using an ITO target (95% In and 5% Sn with 98% to 99% density available from Umicore, Brussels, Belgium). A 6 nm thick second $SiO_x$ layer was then sputter coated on top of the ITO layer.

Next, (4-Dimethylamino-1-[4,6-di(4-carboxyphenylamino)-1,3,5-triazin-2-yl]pyridinium hydrogen sulfate) chromonics material was prepared using the process outlined and described in U.S. Pat. No 5,948,487. A chromonics solution was prepared by mixing 1 gram of the chromonics material with 9 grams of water, 0.3 grams of ammonium hydroxide, 0.001 grams of surfactant Triton X-100 (available from Sigma-Aldrich Corp., St. Louis, Mo.), and 0.1 grams of Direct Blue 199 dye (available from Sensient Technologies, Milwaukee, Wis.).

The chromonics solution was then coated onto the second $SiO_x$ layer using a coating knife. Shear was applied during the coating resulting in an oriented chromonics structure in the chromonics coating. The chromonics coated PET layer was then air dried resulting in a 2 micron thick oriented chromonics alignment layer capable of orienting a thermotropic liquid crystal.

A second chromonics coated PET layer was prepared similar to the first chromonics coated PET layer.

A thermotropic liquid crystal (4-cyano-4'-n-pentylbiphenyl available from Alfa Aesar, Ward Hill, Mass.) was mixed with spacer beads having an average diameter of about 3 microns (silica microspheres obtained from Polysciences, Inc., Warrington, Pa.) at a bead concentration on the order of about 0.01% by weight.

The first chromonics coated PET layer was taped down to a rigid substrate to hold the layer flat. The liquid crystal solution was then applied onto the first chromonics coated PET layer with a micropipette and the second chromonics coated PET layer was placed on top of the liquid crystal solution with the $SiO_x$ side of the second chromonics coated PET layer facing the liquid crystal and with the direction of the orientation of the chromonics layer in the second chromonics coated PET layer being perpendicular to the direction of the orientation of the chromonics layer in the first chromonics coated PET layer. A roller was used to spread the liquid crystal material between the two chromonics coated PET layers with the spacer beads fixing the thickness of the liquid crystal layer to about 3 microns. The edges were then sealed with a UV adhesive (available as Norland Optical Adhesive 68 from Norland Products, Cranbury, N.J.) resulting in an optical shutter. The optical shutter was optically transparent when no voltage was applied across the liquid crystal layer and switched to a darkened opaque state when sufficient voltage was applied across the liquid crystal layer.

Item 1. An optical shutter comprising:
- a light source emitting polarized light having a first polarization state;
- a first polymeric substrate receiving the polarized light and transmitting the polarized light without substantially changing the first polarization state of the polarized light;
- a second polymeric substrate facing the first polymeric substrate; and
- an optical stack disposed between the first and second polymeric substrates and comprising:
- first and second electrically conductive layers;
- first and second oriented chromonics alignment layer; and
- an oriented liquid crystal layer.

Item 2. The optical shutter of item 1, wherein the light source comprises a lamp emitting non-polarized light and means for polarizing the emitted non-polarized light.

Item 3. The optical shutter of item 1, wherein the first polarization state is a linear polarization state.

Item 4. The optical shutter of item 1, wherein the first polarization state is a circular polarization state.

Item 5. The optical shutter of item 1, wherein the first polymeric substrate is substantially optically isotropic.

Item 6. The optical shutter of item 1, wherein the first polymeric substrate is substantially optically uniaxial.

Item 7. The optical shutter of item 1 comprising a first barrier layer.

Item 8. The optical shutter of item 7, wherein the first barrier layer prevents diffusion of at least one of moisture and gas.

Item 9. The optical shutter of item 7, wherein the first barrier layer comprises several sub-layers.

Item 10. The optical shutter of item 9, wherein at least one of the sub-layers comprises a polymeric material.

Item 11. The optical shutter of item 9, wherein at least one of the sub-layers comprises an inorganic material.

Item 12. The optical shutter of item 11, wherein the inorganic material comprises silica.

Item 13. The optical shutter of item 7 further comprising a second barrier layer.

Item 14. The optical shutter of item 1, wherein at least one of the first and second electrically conductive layers comprises indium tin oxide.

Item 15. The optical shutter of item 1, wherein at least one of the first and second electrically conductive layers comprises an organic material.

Item 16. The optical shutter of item 1, wherein at least one of the first and second electrically conductive layers comprises a blend of organic and inorganic materials.

Item 17. The optical shutter of item 1, wherein at least one of the first and second electrically conductive layers is substantially optically transmissive.

Item 18. The optical shutter of item 17, wherein an average optical transmission of at least one of the first and second electrically conductive layers in a visible range of the electromagnetic spectrum is at least 50%.

Item 19. The optical shutter of item 17, wherein an average optical transmission of at least one of the first and second electrically conductive layers in a visible range of the electromagnetic spectrum is at least 70%.

Item 20. The optical shutter of item 1, wherein a sheet resistance of at least one of the first and second electrically conductive layers is in a range from about 60 ohms/square to about 800 ohms/square.

Item 21. The optical shutter of item 1, wherein a sheet resistance of at least one of the first and second electrically conductive layers is in a range from about 100 ohms/square to about 300 ohms/square.

Item 22. The optical shutter of item 1, wherein at least one of the first and second oriented chromonics alignment layers comprises a dichroic dye.

Item 23. The optical shutter of item 22, wherein the dichroic dye is oriented along the first polarization state.

Item 24. The optical shutter of item 1 further comprising one or more retarder layers.

Item 25. The optical shutter of item 24, wherein the one or more retarder layers are outside the optical stack.

Item 26. The optical shutter of item 1, wherein the oriented liquid crystal layer is in a twisted nematic (TN) mode.

Item 27. The optical shutter of item 1, wherein the oriented liquid crystal layer is in an optically compensated bend (OCB) mode.

Item 28. The optical shutter of item 27 further comprising one or more retarder layers.

Item 29. The optical shutter of item 28 further comprising two polarizers.

Item 30. The optical shutter of item 1 further comprising a first linear polarizer.

Item 31. The optical shutter of item 30 further comprising a second polarizer.

Item 32. The optical shutter of item 30 further comprising a retarder.

Item 33. A stereoscopic viewing device for viewing 3D images comprising:

first and second optical shutters of item 1, each optical shutter having an on-state and an off-state;
means for controlling the on- and off-states of each of the first and second optical shutters; and
means for synchronizing the on- and off-states of each of the first and second optical shutters with a signal emitted by the polarized light source.

Item 34. The stereoscopic viewing device of item 33, wherein the signal emitted by the polarized light source comprises an IR signal.

Item 35. The stereoscopic viewing device of item 33, wherein the signal emitted by the polarized light source comprises an RF signal.

Item 36. The stereoscopic viewing device of item 33, wherein the signal emitted by the polarized light source comprises a microwave signal.

Item 37. The stereoscopic viewing device of item 33, wherein the first and second optical shutters are mounted on a frame.

Item 38. The optical shutter of item 1, wherein the optical stack comprises an adhesion promoting layer immediately adjacent the first or second electrically conductive layer for promoting adhesion between the electrically conductive layer and a neighboring layer.

Item 39. The optical shutter of item 38, wherein the adhesion promoting layer comprises $SiO_x$.

As used herein, terms such as "vertical", "horizontal", "above", "below", "top", "bottom" "left", "right", "upper" and "lower", "clockwise" and "counter clockwise" and other similar terms, refer to relative positions as shown in the figures. In general, a physical embodiment can have a different orientation, and in that case, the terms are intended to refer to relative positions modified to the actual orientation of the device. For example, even if the image in FIG. 1 is flipped as compared to the orientation in the figure, first polymeric substrate 100 is still considered to be the top substrate.

All patents, patent applications, and other publications cited above are incorporated by reference into this document as if reproduced in full. While specific examples of the invention are described in detail above to facilitate explanation of various aspects of the invention, it should be understood that the intention is not to limit the invention to the specifics of the examples. Rather, the intention is to cover all modifications, embodiments, and alternatives falling within the spirit and scope of the invention as defined by the appended claims.

The invention claimed is:

1. An optical shutter comprising:
a light source emitting polarized light having a first polarization state;
a first polymeric substrate receiving the polarized light and transmitting the polarized light without substantially changing the first polarization state of the polarized light;
a second polymeric substrate facing the first polymeric substrate; and
an optical stack disposed between the first and second polymeric substrates and comprising:
first and second electrically conductive layers;
first and second oriented chromonics alignment layer; and
an oriented liquid crystal layer.

2. The optical shutter of claim 1, wherein the light source comprises a lamp emitting non-polarized light and means for polarizing the emitted non-polarized light.

3. The optical shutter of claim 1, wherein the first polarization state is a linear polarization state.

4. The optical shutter of claim 1, wherein the first polarization state is a circular polarization state.

5. The optical shutter of claim 1, wherein the first polymeric substrate is substantially optically isotropic.

6. The optical shutter of claim 1, wherein the first polymeric substrate is substantially optically uniaxial.

7. The optical shutter of claim 1 comprising a first barrier layer.

8. The optical shutter of claim 7, wherein the first barrier layer prevents diffusion of at least one of moisture and gas.

9. The optical shutter of claim 7, wherein the first barrier layer comprises several sub-layers.

10. The optical shutter of claim 9, wherein at least one of the sub-layers comprises a polymeric material.

11. The optical shutter of claim 9, wherein at least one of the sub-layers comprises an inorganic material.

12. The optical shutter of claim 11, wherein the inorganic material comprises silica.

13. The optical shutter of claim 7 further comprising a second barrier layer.

14. The optical shutter of claim 1, wherein at least one of the first and second electrically conductive layers comprises indium tin oxide.

15. The optical shutter of claim 1, wherein at least one of the first and second electrically conductive layers comprises an organic material.

16. The optical shutter of claim 1, wherein at least one of the first and second electrically conductive layers comprises a blend of organic and inorganic materials.

17. The optical shutter of claim 1, wherein at least one of the first and second electrically conductive layers is substantially optically transmissive.

18. The optical shutter of claim 17, wherein an average optical transmission of at least one of the first and second electrically conductive layers in a visible range of the electromagnetic spectrum is at least 50%.

19. The optical shutter of claim 17, wherein an average optical transmission of at least one of the first and second electrically conductive layers in a visible range of the electromagnetic spectrum is at least 70%.

20. The optical shutter of claim 1, wherein a sheet resistance of at least one of the first and second electrically conductive layers is in a range from about 60 ohms/square to about 800 ohms/square.

21. The optical shutter of claim 1, wherein a sheet resistance of at least one of the first and second electrically conductive layers is in a range from about 100 ohms/square to about 300 ohms/square.

22. The optical shutter of claim 1, wherein at least one of the first and second oriented chromonics alignment layers comprises a dichroic dye.

23. The optical shutter of claim 22, wherein the dichroic dye is oriented along the first polarization state.

24. The optical shutter of claim 1 further comprising one or more retarder layers.

25. The optical shutter of claim 24, wherein the one or more retarder layers are outside the optical stack.

26. The optical shutter of claim 1, wherein the oriented liquid crystal layer is in a twisted nematic (TN) mode.

27. The optical shutter of claim 1, wherein the oriented liquid crystal layer is in an optically compensated bend (OCB) mode.

28. The optical shutter of claim 27 further comprising one or more retarder layers.

29. The optical shutter of claim 28 further comprising two polarizers.

30. The optical shutter of claim 1 further comprising a first linear polarizer.

31. The optical shutter of claim 30 further comprising a second polarizer.

32. The optical shutter of claim 30 further comprising a retarder.

33. A stereoscopic viewing device for viewing 3D images comprising:
- first and second optical shutters of claim 1, each optical shutter having an on-state and an off-state;
- means for controlling the on- and off-states of each of the first and second optical shutters; and
- means for synchronizing the on- and off-states of each of the first and second optical shutters with a signal emitted by the polarized light source.

34. The stereoscopic viewing device of claim 33, wherein the signal emitted by the polarized light source comprises an IR signal.

35. The stereoscopic viewing device of claim 33, wherein the signal emitted by the polarized light source comprises an RF signal.

36. The stereoscopic viewing device of claim 33, wherein the signal emitted by the polarized light source comprises a microwave signal.

37. The stereoscopic viewing device of claim 33, wherein the first and second optical shutters are mounted on a frame.

38. The optical shutter of claim 1, wherein the optical stack comprises an adhesion promoting layer immediately adjacent the first or second electrically conductive layer for promoting adhesion between the electrically conductive layer and a neighboring layer.

39. The optical shutter of claim 38, wherein the adhesion promoting layer comprises $SiO_x$.

* * * * *